(12) United States Patent
Lauth et al.

(10) Patent No.: US 11,312,061 B2
(45) Date of Patent: Apr. 26, 2022

(54) FORMING STATION WITH PUSH-IN UNIT INTEGRATED IN THE MALE DIE PART AND METHOD

(71) Applicant: MULTIVAC Sepp Haggenmüller SE & Co. KG, Wolfertschwenden (DE)

(72) Inventors: Frank Lauth, Niederdorf (DE); Roland Wilhelm, Bad Grönenbach (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 437 days.

(21) Appl. No.: 16/126,147

(22) Filed: Sep. 10, 2018

(65) Prior Publication Data

US 2019/0077066 A1     Mar. 14, 2019

(30) Foreign Application Priority Data

Sep. 11, 2017  (DE) .......................... 102017215968.5

(51) Int. Cl.
| | |
|---|---|
| *B29C 51/20* | (2006.01) |
| *B29C 51/30* | (2006.01) |
| *B65B 47/04* | (2006.01) |
| *B29C 51/04* | (2006.01) |
| *B29C 51/34* | (2006.01) |

(Continued)

(52) U.S. Cl.
CPC .............. *B29C 51/30* (2013.01); *B29C 51/04* (2013.01); *B29C 51/082* (2013.01); *B29C 51/34* (2013.01);

(Continued)

(58) Field of Classification Search
None
See application file for complete search history.

(56) References Cited

U.S. PATENT DOCUMENTS

| 2,484,656 A | 10/1949 | Sikka et al. |
| 3,123,863 A | 3/1964 | Reilly et al. |
| (Continued) | | |

FOREIGN PATENT DOCUMENTS

| CA | 1135020 A | 11/1982 |
| DE | 20319530 U1 | 4/2004 |
| (Continued) | | |

OTHER PUBLICATIONS

European Search Report dated Feb. 4, 2019, Application No. 18 193 656.8-1014, Applicant MULTIVAC Sepp Haggenmueller SE & CO. KG, 8 Pages.

(Continued)

*Primary Examiner* — Alexander M Weddle
(74) *Attorney, Agent, or Firm* — Brooks Kushman P.C.

(57) ABSTRACT

A forming station for producing a packaging trough by thermoforming at least an area of a film web positioned between a forming tool upper part and a forming tool lower part of the forming station. A male die part of the forming tool upper part may be moved in a vertical direction and inserted into a forming space of a female die part of the forming tool lower part. The packaging trough is produced by deforming the film web between the male die part and an inner wall of the forming space of the female die part. In an inserted condition of the male die part within the female die art, a push-in unit is extended from the male die part towards the inner wall of the forming space at an angular orientation relative to the vertical direction.

21 Claims, 2 Drawing Sheets

(51) Int. Cl.
  *B29C 51/08* (2006.01)
  *B65B 47/08* (2006.01)
  *B29C 51/42* (2006.01)
  *B29L 31/00* (2006.01)
  *B29C 51/26* (2006.01)

(52) U.S. Cl.
  CPC .............. *B65B 47/04* (2013.01); *B65B 47/08* (2013.01); *B29C 51/265* (2013.01); *B29C 51/428* (2013.01); *B29L 2031/712* (2013.01); *B29L 2031/7162* (2013.01)

(56) References Cited

U.S. PATENT DOCUMENTS

| | | | |
|---|---|---|---|
| 3,484,900 A | 12/1969 | Broome et al. | |
| 4,338,070 A * | 7/1982 | Nava | B29C 43/3642 425/112 |
| 5,573,789 A * | 11/1996 | Weder | A01G 9/02 425/394 |
| 6,440,354 B1 * | 8/2002 | Takai | B29C 51/343 264/550 |

FOREIGN PATENT DOCUMENTS

| | | |
|---|---|---|
| EP | 1514668 A1 | 3/2005 |
| JP | 61105126 U | 7/1986 |
| JP | H02160530 A | 6/1990 |
| WO | 2007006551 A1 | 1/2007 |

OTHER PUBLICATIONS

European Notice of Allowance dated Nov. 9, 2020, Application No. 18 193 656 8-1014, Applicant MULTIVAC Sepp Haggenmueller SE & CO. KG, 5 Pages.

* cited by examiner

FORMING STATION WITH PUSH-IN UNIT INTEGRATED IN THE MALE DIE PART AND METHOD

CROSS-REFERENCE TO RELATED APPLICATIONS

This Application claims priority to German Patent Application No. 102017215968.5 filed on Sep. 11, 2017 to Frank Lauth and Roland Wilhelm, currently pending, the entire disclosure of which is incorporated herein by reference.

FIELD OF THE INVENTION

The present invention relates to the field of producing packaging troughs by thermoforming a film web.

BACKGROUND OF THE INVENTION

EP 1 514 668 A1, for example, discloses a forming tool for thermoforming containers from thermoplastic material. A heated film web is conveyed to a position between a tool upper part and a tool lower part with a forming cavity. Subsequently, an extension helper of the tool upper part is moved downwards into the forming cavity of the tool lower part along a vertical direction, the film web located between the tool lower part and the tool upper part being entrained by this movement. During the movement of the extension helper into the forming cavity, compressed air is already blown from lateral openings provided in the extension helper, so as to press the film against an inner wall of the forming cavity. In this way, a container corresponding to the shape of the inner wall of the forming cavity is produced by thermoforming. After cooling down, the container is punched out and ejected in the open condition of the forming tool, or it is fed to downstream units in a condition in which it is connected to the rest of the film web. Such a system is disadvantageous insofar as the shapes that can be given to of the containers produced by thermoforming are limited. In particular, the provision of recesses in sidewalls of the container is only possible to a limited extent. Especially when films/foils having large thicknesses of e.g. 700 μm or more are thermoformed, the contact established between the film and an inner wall of the mold cavity in the area of lateral recesses in the inner wall would often only be of unsatisfactory quality.

It is known from practice to form, by pressing-in performed in a separate processing step after thermoforming, recesses and notches in a plastic packaging trough as reclosure elements for retaining engagement with a package lid. In addition to the necessity of a further processing step, this is also disadvantageous insofar as, especially in the case of thicker rigid films, so-called "stress-whitening" will occur, when the cold film is formed after thermoforming, and this may be undesirable for aesthetic reasons and may also impair the stability of the package.

WO 2007/006551 A1 discloses that a packaging trough may be first produced by thermoforming, whereupon it may be filled and sealed with a lid, and that, subsequently, the packaging trough and the lid are reshaped together in a separate processing step for establishing a form-fit connection between the packaging trough and the lid. When the package has been opened by peeling the sealing between the packaging trough and the lid, the package can be closed again by means of the form-fit connection. The form-fit connection between the packaging trough and the lid may be produced by thermoforming in a separate processing step. This may be done by jointly deforming the packaging trough and the lid by means of an embossing device, which cooperates with a counterbearing for forming the connection, the counterbearing being provided on the side of the packaging trough and the lid located opposite the embossing device. Also this solution necessitates the provision of an additional processing step and of an additional processing station.

SUMMARY OF THE INVENTION

It is an object of the present invention to provide, also for larger film/foil thicknesses (e.g. thicker than 700 μm), a way of producing thermoformed packaging troughs having a complex shape by means that are as simple as possible.

This object may be achieved by a method for producing a packaging trough by thermoforming at least an area of a film web that is positioned between a forming tool upper part and a forming tool lower part of a forming station. A male die part of the forming tool upper part may be inserted along a vertical direction into a forming space of a female die part of the forming tool lower part. In this way, a packaging trough may be produced through thermoforming in the film web by deforming the film web between the male die part and an inner wall of the forming space of the female die part. Depending on the desired shape of the packaging trough, a suitable inner wall of the forming space of the female die part can be chosen. The film web can be supported in entering into contact with the inner wall of the forming space of the female die part by applying a negative pressure between the film web and the inner wall and/or by applying an overpressure between the film web and the male die part.

In order to simplify the description of the present invention, the direction in which the male die part of the forming tool upper part may be inserted into the forming space of the female die part may be referred to as "vertical direction". Preferably, this direction may be actually vertical. However, it goes without saying that the invention should not be limited to this. The direction of insertion of the male die part into the forming space of the female die part clearly depends on the orientation of the forming station in space. Depending on the respective structural design of the forming station, the direction of insertion of the male die part of the forming tool upper part into the forming space of the female die part, i.e. the "vertical direction" in the sense of the present invention, may, in principle, be arbitrarily oriented in space.

According to the present invention, a push-in unit is, in the inserted condition of the male die part, in particular in the maximum inserted condition of the male die part, extended from the male die part towards the inner wall of the forming space at an angle relative to the vertical direction. Extending the push-in unit can support the film in entering into contact with inner wall of the forming space. In this way, the quality of the shape of the packaging troughs produced can be improved, even if complicated shapes are involved. Especially in the event that thicker films having a thickness of e.g. more than 700 μm are processed, supporting the film in entering into contact with the inner wall of the forming space by means of the push-in unit will have a positive effect on the forming result.

The push-in unit allows to provide lateral bulges in the packaging trough immediately during the thermoforming process. A subsequent, additional processing step after thermoforming is therefore no longer necessary. In this way, especially packaging troughs with reclosure recesses or reclosure notches for reversible engagement with a lid can be produced in a particularly efficient way.

As described above, the push-in unit may be intended to be extended from the male die part at an angle relative to the vertical direction. This means that the direction of extension of the push-in unit may not be parallel to the direction of insertion of the male die part into the forming space of the female die part. It will be particularly advantageous when the angle between the direction of extension of the push-in unit and the vertical direction may be an angle in the range of 30° to 150° or an angle in the range of 45° to 135° or an angle in the range of 85° to 95°. In particular, the push-in unit may be extended from the male die part at least substantially perpendicular to the vertical direction.

Preferably, the push-in unit may be extended from the male die part by a respective actuator by means of compressed air, mechanically and/or by means of spring force. Extension by means of compressed air may be particularly easy to realize, if a compressed air supply is already provided at the forming station, e.g. for generating an overpressure between the film and the male die part during thermoforming. A mechanical extension of the push-in unit can be controlled in a particularly precise and defined manner, e.g. by means of a servomotor. If the push-in unit may be extended by means of spring force, the forming station can have a particularly resistant and robust structural design.

In principle, arbitrary shapes are imaginable for the push-in unit. Preferably, the push-in unit may have the shape of a wedge or of a bead and may be thus suitable for forming recesses or notches for receiving therein a reclosable lid for closing the packaging trough.

It may be also imaginable to provide a plurality of push-in units, which are extended synchronously or independently of one another from the male die part towards the inner wall of the forming space, in particular at an angle relative to the vertical direction. In this way, individual reclosure recesses and reclosure notches can be formed in the packaging trough at spaced apart locations, so as to guarantee a particularly reliable and tight reclosability.

Preferably, at least the male die part and/or the female die part are heated, so that the optionally already preheated film will be heated during the thermoforming process and will become or remain thermoplastically deformable. Since the push-in unit may be accommodated in the male die part during insertion of the male die part, heat will be transferred between the male die part and the push-in unit, so that in the case of a heated male die part the push-in unit will be heated as well. The film can thus be deformed by the push-in unit more easily. However, it would also be imaginable that, alternatively or additionally to heating the male die part and/or the female die part, the push-in unit may be adapted to be heated separately. In this way, the temperature of the push-in unit could especially be adjusted separately. Heating of the male die part, the female die part and/or the push-in unit can take place by means of a suitable heating device, in particular an electrical heating device.

Preferably, the inner wall of the forming space comprises a recess, in which the push-in unit may be received, at least partially, during extension. Such a recess may, in particular as regards its shape, be configured complementarily to the push-in unit, so as to allow the push-in unit to press the film optimally against the inner wall. The recess may especially be groove-shaped or notch-shaped.

It would be imaginable to actively retract the push-in unit, partially or fully, before the male die part may be moved out of the forming space of the female die part. However, it will be particularly advantageous when, while the male die part is moving out of the forming space of the female die part, the push-in unit may be automatically retracted, at least partially, through engagement with the inner wall of the forming space, in particular with the recess provided in the inner wall. This can be made possible by giving the push-in unit and the inner wall a suitable shape.

The present invention further relates to a forming station for producing a packaging trough by thermoforming. The forming station may be suitable, configured and adapted for carrying out the method according to the present invention. Features described in connection with the method can be transferred to the forming station and vice versa.

The forming station according to the present invention for producing a packaging trough by thermoforming comprises a forming tool upper part with a male die part and a forming tool lower part with a female die part. The male die part of the forming tool upper part may be configured for insertion into a forming space of the female die part of the forming tool lower part along a vertical direction so as to produce by thermoforming a packaging trough in a film web by deforming the film web between the male die part and the inner wall of the forming space of the female die part. The forming station further comprises a push-in unit which may be configured to be extended in the inserted condition of the male die part from the male die part towards the inner wall of the forming space at an angle relative to the vertical direction.

Further features of the forming station can be seen from the above description of the method according to the present invention. In particular, the forming station may comprise the actuator described, which may be configured to extend the push-in unit by means of compressed air, mechanically and/or by means of spring force. Alternatively or additionally, the forming station may comprise the heating device described, which may be used for heating the male die part, the female die part and/or the push-in unit.

Other aspects and advantages of the present invention will be apparent from the following detailed description of the preferred embodiments and the accompanying drawing figures.

DESCRIPTION OF THE SEVERAL VIEWS OF THE DRAWINGS

In the following, an advantageous embodiment of the present invention will be explained in more detail making reference to a drawing, in which the individual figures show.

DETAILED DESCRIPTION OF THE INVENTION

Figure 1:
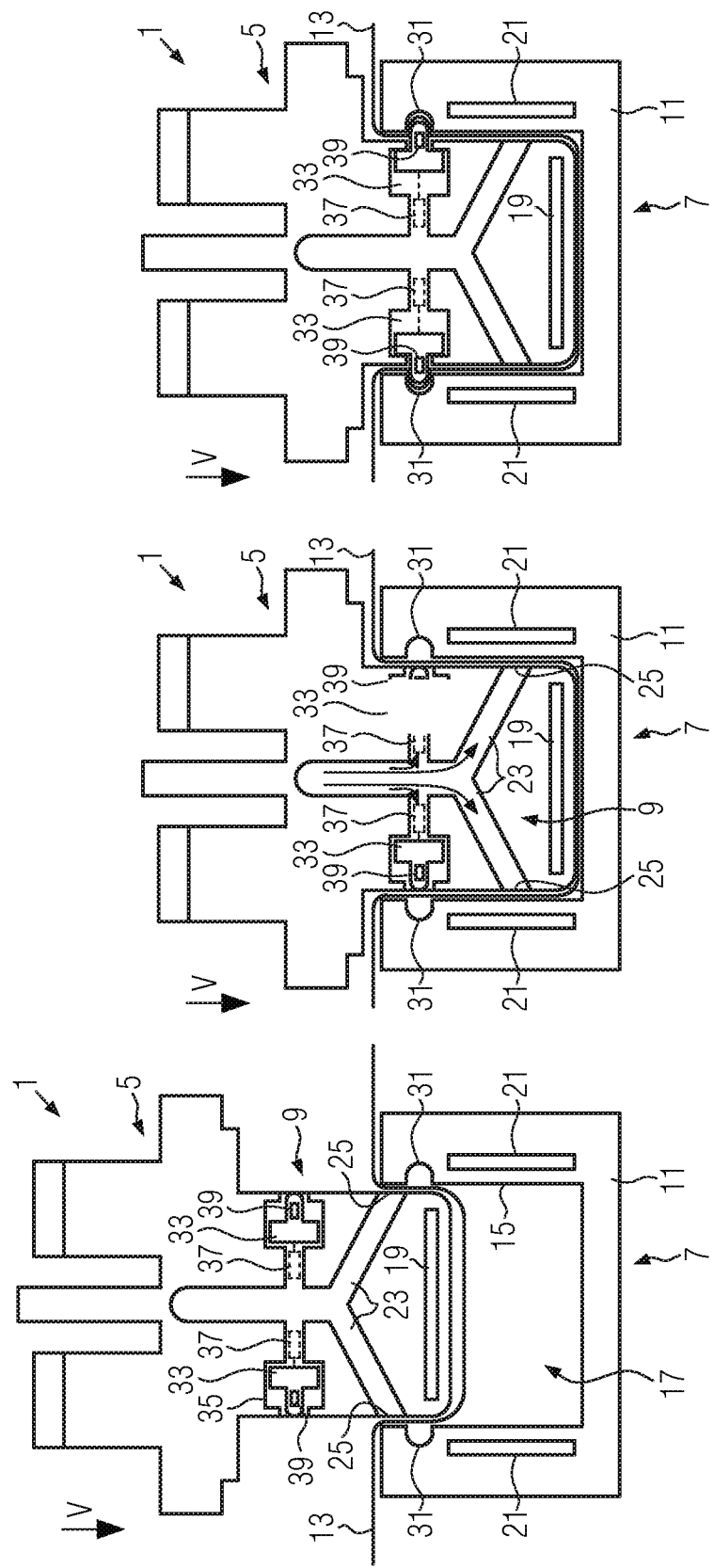
FIG. 1A is a schematic sectional view of one embodiment of a forming station in accordance with the teachings of the present disclosure showing forming tool upper part being introduced into the forming space of the female die part.
FIG. 1B is a schematic sectional view of one embodiment of a forming station in accordance with the teachings of the present disclosure showing forming tool upper part being fully inserted into the forming space of the female die part.
FIG. 1C is a schematic sectional view of one embodiment of a forming station in accordance with the teachings of the present disclosure showing forming tool upper part being introduced into the forming space of the female die part.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

As shown in FIG. 1A, a forming station 1 for producing a packaging trough 3 by thermoforming comprises, according to an embodiment, a forming tool upper part 5 and a forming tool lower part 7. The forming tool upper part 5 comprises a male die part 9 and the forming tool lower part 7 comprises a female die part 11. The male die part 9 and the female die part 11 cooperate so as to produce by thermoforming a packaging trough 3 from a film web 13, which has been positioned, at least sectionwise, between the forming tool upper part 5 and the forming tool lower part 7 and which may be in particular thermoplastically deformable. To this end, the female die part 11 comprises a forming space 17 defined by an inner wall 15. Depending on the desired shape of the packaging trough 3, the forming space 17 of the female die part 11 may be given a suitable shape. In the embodiment shown, a substantially rectangular-shaped packaging trough 3 may be formed. Accordingly, the forming space 17 of the female die part 11 may be substantially rectangular-shaped.

Prior to feeding the film web 13 into the forming station 1, the film web 13 may be preheated from one or from both sides, i.e. from above and/or from below, by heating units in one or a plurality of preheating stations (not shown).

After the film web 13 has been positioned, at least sectionwise, between the forming tool upper part 5 and the forming tool lower part 7 and has optionally been clamped in position between the forming tool upper part 5 and the forming tool lower part 7, the male die part 9 of the forming tool upper part 5 is introduced into the forming space 17 of the female die part 11 along a vertical direction V, as shown in FIG. 1A. This has the effect that the film web 13 is thermoformed so to speak into the interior of the forming space 17. In order to allow the film web 13 to be deformed more easily, the male die part 9 is heated by means of an electrical heating device 19 provided in the male die part 9 in the embodiment shown. Alternatively or additionally, it would also be imaginable to heat the female die part 11, e.g. by an electrical heating device 21 provided in the female die part 11. By heating the male die part 9 and/or the female die part 11, the film web 13 can be caused to assume a state in which can be deformed more easily.

Figure 2:
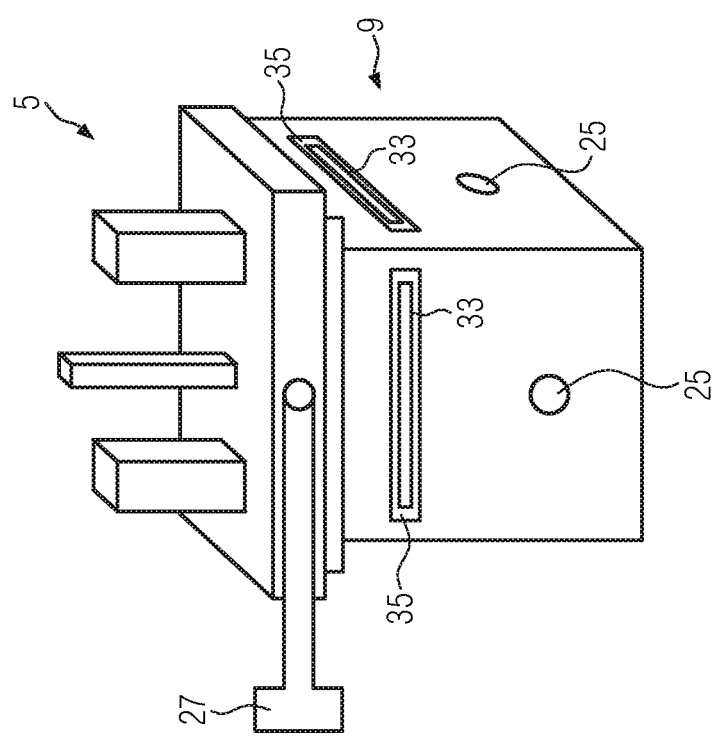
FIG. 2 is a schematic perspective view of one embodiment of a male die part of a forming station in accordance with the teachings of the present disclosure.

Preferably, the forming of the packaging trough 3 does not take place through the interaction between the male die part 9 and the inner wall 15 of the forming space 17 of the female die part 11 alone, but is supported by additional measures. In the embodiment shown, an overpressure is generated between the film web 13 and the male die part 9, said overpressure acting on the film web 13 in the direction of the inner wall 15 of the forming space 17. This has the effect that the film web 13 enters into contact with the inner wall 15 of the forming space 17 and thus assumes the desired shape. In the embodiment shown, compressed air ducts 23 with respective compressed air outlets 25 are provided in the male die part 9 so as to generate the overpressure. As can be seen from the schematic perspective view of the forming tool upper part 5 according to FIG. 2, the forming tool upper part 5 may be connected to an external compressed air source 27 for supplying the compressed air ducts 23 with compressed air. Alternatively, it would e.g. be imaginable to apply a negative pressure between the inner wall 15 of the forming space 17 of the female die part 11 and the film web 13. For this purpose, suction openings could be provided in the inner wall 15 of the forming space 17.

In the embodiment shown, a packaging trough 3 is to be formed, which has reclosure notches 29. These reclosure notches 29 are to be configured for receiving therein a lid for the packaging trough 3 such that reclosure will be possible later on. Accordingly, the inner wall 15 of the forming space 17 of the female die part 11 defines recesses 31, which indicate the shape of the reclosure notches 29. As can be seen FIG. 1B, it may, especially in the event that film webs 13 of larger thicknesses (e.g. larger than 1000 µm) are used, happen that the overpressure applied between the film web 13 and the male die part 9 will not suffice to cause in the area of the recesses 31 a full area contact between the film web 13 and the inner wall 15 of the forming space 17 of the female die part 11.

In order to support the film web 13 in entering into contact with the inner wall 15 of the forming space 17 in the area of the recesses 31, push-in units 33 are provided according to the embodiment shown, which, in the inserted condition of the male die part 9, are extended from the male die part 9 in the direction of the inner wall 15 of the forming space 17 at an angle relative to the vertical direction V. The push-in units 33 are provided in the male die part 9 at positions corresponding to the recesses 31 of the inner wall 15 of the forming space 17, so that, when extended, the push-in units 33 are accommodated at least partially in the recesses 31, as shown in FIG. 1C. When the push-in units 33 are being extended, the film web 13 is so to speak pushed into the recesses 31. This will support the film web 13 in entering into contact with the inner wall 15 of the forming space 17 in the area of the recesses 31, and thus the formation of the reclosure notches 29. As regards the formation of the reclosure notches 29, it will be particularly advantageous, when the push-in unit 33 has the shape of a wedge or a bead. However, other shapes for the push-in unit 33 would be imaginable as well.

In the embodiment shown, the push-in units 33 are extended by means of compressed air. For this purpose, chambers 35 of the male die part 9, which accommodate the push-in units 33 therein, are connected to the compressed air ducts 23 provided in the male die part 9. When, in the fully inserted condition of the male die part 9 (FIG. 1B), the supply of compressed air by means of the compressed air source 27 is activated, also the chambers 35 are supplied with compressed air, whereby the push-in units 33 in the chambers 35 are pushed outwards, i.e. they are extended. This is particularly advantageous, since the compressed air source 27, which is provided anyhow, also acts as an actuator for extending the push-in units 33. Alternatively or additionally, it would, however, also be imaginable to provide separate actuators 37 for extending the push-in units 33. Such separate actuators 37 are shown by a dashed line in FIG. 1. The actuators 37 may e.g. be configured to extend the push-in units 33 by spring force or mechanically. The actuators 37 may e.g. be spring units or stepping motors.

In the embodiment shown, the push-in units 33 are extended from the male die part 9 substantially perpendicularly to the vertical direction V. Depending on the position and the shape of the push-in units 33 and the recesses 31 in the inner wall 15 of the forming space 17, the push-in units 33 may, however, also be extended at a different angle relative to the vertical direction V. It will be particularly advantageous, when the angle between the direction of extension of the push-in unit 33 and the vertical direction V is an angle in the range of 30° to 150° or an angle in the range of 45° to 135° or an angle in the range of 85° to 95°.

In order to allow the male die part 9 to move out of the forming space 17 of the female die part 11 in a direction opposite to the vertical direction V after thermoforming, the push-in units 33 can be retracted actively by means of the actuator 37. However, it would also be imaginable that the push-in units 33 are automatically retracted through engagement with the inner wall 15 of the forming space 17 in the area of the recesses 31 while the male die part 9 is moving out of the forming space 17 of the female die part 11. This can be simplified especially by choosing a suitable shape of the recesses 31 as well as of the push-in units 33. In particular, wedge-shaped push-in units 33 will be advantageous.

In view of the fact that the push-in units 33 are provided in the male die part 9, they will be heated automatically together with the male die part 9 during heating of the latter, whereby the push-in units 33 will be more easily able to deform the film web 13. However, it would also be imaginable to provide the push-in units 33 with separate heating devices 39, which may in particular be configured as electrical heating devices.

The forming station 1 shown comprises a plurality of push-in units 33 and respective recesses 31 in the inner wall 15 of the forming space 17 of the female die part 11. It goes without saying that the present invention also includes embodiments having only one push-in unit 33 and/or one recess 31.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for producing a packaging trough by thermoforming, the method comprising the steps of:
   positioning at least an area of a film web between a forming tool upper part and a forming tool lower part of a forming station;
   inserting a male die part of the forming tool upper part along a vertical direction into a forming space of a female die part of the forming tool lower part;
   forming a packaging trough in the film web through thermoforming by deforming the film web between the male die part and an inner wall of the female die part that defines the forming space; and
   extending a push-in unit from the male die part towards the inner wall of the female die part at a non-zero angle relative to the vertical direction when the male die part is disposed in an inserted condition in the forming space;
   wherein during the extending the push-in unit step, the push-in unit is at least partially extended into a recess defined by the inner wall of the female die part, wherein the recess defines an additional forming space that extends outwardly from the forming space.

2. The method according to claim 1, wherein the extending the push-in unit step further comprises the push-in unit being extended using compressed air, mechanically and/or using spring force.

3. The method according to claim 1, wherein the push-in unit has a shape of a wedge.

4. The method according to claim 1, further comprising the step of extending a plurality of push-in units from the male die part in a direction towards the inner wall of the female die part.

5. The method according to claim 1, further comprising the step of heating one of the male die part, the female die part, or the push-in unit.

6. The method according to claim 1, further comprising the step of removing the male die part from the forming space of the female die part, and at least partially retracting the push-in unit automatically through engagement with the inner wall of the female die part.

7. The method according to claim 1, wherein during the extending the push-in unit step, the push-in unit causes the film web to contact the inner wall in the recess.

8. The method according to claim 1, wherein the non-zero angle comprises an angle in the range of 30° to 150°.

9. The method according to claim 1, wherein forming the packaging trough in the film web comprises generating an overpressure between the film web and the male die part or applying a negative pressure between the film web and the inner wall of the female die part.

10. The method according to claim 1, wherein forming the packaging trough in the film web comprises generating an overpressure between the film web and the male die part by introducing compressed air into a compressed air duct provided in the male die part so that the overpressure acts on the film web in a direction toward the inner wall of the female die part, and wherein extending the push-in unit from the male die part is performed using compressed air introduced through the compressed air duct.

11. The method according to claim 1, wherein extending the push-in unit from the male die part towards the inner wall of the female die part is performed to form an outwardly extending notch in the packaging trough proximate an upper end of the packaging trough, wherein the notch is configured to receive a lid for closing the packaging trough.

12. The method according to claim 1, wherein extending the push-in unit from the male die part towards the inner wall of the female die part is performed to form a notch in a lateral wall of the packaging trough.

13. A method for producing a packaging trough by thermoforming, the method comprising:
positioning at least an area of a film web between a forming tool upper part and a forming tool lower part of a forming station;
inserting a male die part of the forming tool upper part along a vertical direction into a forming space of a female die part of the forming tool lower part;
forming a packaging trough in the film web through thermoforming by deforming the film web between the male die part and an inner wall of the female die part that defines the forming space; and
extending a push-in unit from the male die part towards the inner wall of the female die part at a non-zero angle relative to the vertical direction when the male die part is disposed in an inserted condition in the forming space;
wherein forming the packaging trough in the film web comprises generating an overpressure between the film web and the male die part by introducing compressed air into a compressed air duct provided in the male die part so that the overpressure acts on the film web in a direction toward the inner wall of the female die part, and wherein extending the push-in unit from the male die part is performed using compressed air introduced through the compressed air duct.

14. A forming station for producing a packaging trough by thermoforming, comprising:
a forming tool upper part with a male die part; and
a forming tool lower part with a female die part, wherein the male die part of the forming tool upper part is configured for insertion into a forming space of the female die part of the forming tool lower part along a vertical direction so as to produce by thermoforming a packaging trough in a film web by deforming the film web between the male die part and an inner wall of the female die part that defines the forming space,
wherein a push-in unit is configured to be extended in an inserted condition of the male die part from the male die part towards the inner wall of the female die part at a non-zero angle relative to the vertical direction;
wherein the inner wall of the female die part defines a recess, wherein the recess has a shape and is disposed to at least partially receive the push-in unit when the push-in unit is disposed in an extended condition.

15. The forming station according to claim 14, further comprising an actuator operable to extend the push-in unit using compressed air, mechanically, and/or using a spring force.

16. The forming station according to claim 14, wherein the push-in unit has a shape of a wedge.

17. The forming station according to claim 14, comprising a plurality of push-in units, wherein each of the plurality of push-in units is extendable from the male die part in a direction toward the inner wall of the female die part.

18. The forming station according to claim 14, further comprising a heating device for heating one of the male die part, the female die part, or the push-in unit.

19. The forming station according to claim 14, wherein the push-in unit is at least partially automatically retractable through engagement with the inner wall of the female die part when the male die part is moving out of the forming space of the female die part after thermoforming the packaging trough.

20. The forming station according to claim 14, wherein the non-zero angle comprises an angle in the range of 30° to 150°.

21. The forming station according to claim 14, wherein the push-in unit is configured to form a notch in the packaging trough.

\* \* \* \* \*